United States Patent [19]

Ohira

[11] Patent Number: 5,234,980
[45] Date of Patent: Aug. 10, 1993

[54] FIRE RETARDANT POLYCARBONATE RESIN COMPOSITION COMPRISING MIXTURE OF PARTIALLY ESTERIFIED PHOSPHORIC ACIDS

[75] Inventor: Yoji Ohira, Mihara, Japan

[73] Assignee: Teijin Chemicals, Ltd., Tokyo, Japan

[21] Appl. No.: 906,482

[22] Filed: Jun. 30, 1992

[30] Foreign Application Priority Data

Jul. 1, 1991 [JP] Japan .................. 3-185883

[51] Int. Cl.$^5$ ............................................. C08L 69/00
[52] U.S. Cl. ................................. 524/141; 524/117; 524/118; 524/142; 524/145
[58] Field of Search ............ 524/141, 142, 145, 117, 524/118

[56] References Cited

U.S. PATENT DOCUMENTS 4,170,614  10/1979  Crano ................................. 260/983
5,013,776   5/1991  Ishihata et al. ..................... 524/141

FOREIGN PATENT DOCUMENTS 0342696  11/1989  European Pat. Off. .

OTHER PUBLICATIONS

Chem. Abstracts 77:141000b (1972) Abstract of Japanese Patent 47-13,538.
Chem. Abstracts 113:232760c (1990) Abstract of Japanese Laid-Open Patent Publication No. 2-099,560.

Primary Examiner—Harold D. Anderson
Attorney, Agent, or Firm—Sherman and Shalloway

[57] ABSTRACT

There is provided a fire retardant polycarbonate resin composition comprising a polycarbonate resin, a specific partially esterified phosphoric acid metal salt and a specific partially esterified phosphoric acid in specific proportions. The polycarbonate resin composition can provide a transparent molded article which are excellent in fire retardance and heat stability.

4 Claims, No Drawings

FIRE RETARDANT POLYCARBONATE RESIN COMPOSITION COMPRISING MIXTURE OF PARTIALLY ESTERIFIED PHOSPHORIC ACIDS

This invention relates to a fire retardant polycarbonate resin composition. More specifically, this invention relates to a polycarbonate resin composition which provides a molded article excellent in fire retardance and heat stability.

The present inventors discovered that polycarbonate resin compositions containing aromatic group-containing, partially esterified phosphoric acid metal salts provide transparent molded articles having excellent fire retardance, and already proposed it in Japanese Patent Applications Nos. 122070/1988, 197093/1988 and 29147/1991. The molded articles made of these compositions are considerably improved in heat stability. However, polycarbonate compositions that can provide molded articles excellent in not only fire retardance but also heat stability while keeping basic properties such as transparency, etc. have been demanded depending on the use.

Thus, an object of this invention is to provide a polycarbonate resin composition which gives a transparent molded article excellent in fire retardance and heat stability.

The present inventors have made assiduous studies to achieve the aforesaid object, and as a result, have found that when a polycarbonate resin is mixed with an aromatic group-containing, partially esterified phosphoric acid metal salt and a conjugated acid corresponding to this, a molded article having excellent fire retardance and quite excellent heat stability while keeping basic properties such as transparency, etc. can be provided, compared to a polycarbonate resin composition comprising an aromatic group-containing, partially esterified phosphoric acid metal salt alone, and that especially when the mixing ratio of the aromatic group-containing, partially esterified phosphoric acid metal salt and the conjugated acid corresponding to this is within the specific range, a molded article having the best heat stability can be provided.

Thus, according to this invention, there is provided a fire retardant polycarbonate resin composition comprising 100 parts by weight of a polycarbonate resin, and 0.001 to 5 parts by weight in total of a partially esterified phosphoric acid metal salt represented by formula [1]

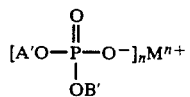

wherein A' and B', independently from each other, denote an aromatic group, A' and B' may optionally be linked with each other either directly or via an alkylene group or may optionally form together one fused ring, an alkyl group, an aryl group, an arylalkyl group and/or a halogen group may optionally be introduced into A' and B'; M denotes an alkali metal atom or an alkaline earth metal atom; and n is a number corresponding to a valence of M, and a partially esterified phosphoric acid represented by formula [2]

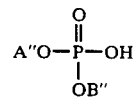

wherein A" denotes an aromatic group; B" denotes an aromatic group or a hydrogen atom; when A" and B" are both aromatic rings, A" and B" may optionally be linked with each other either directly or via an alkylene group or may optionally form together one fused ring; and an alkyl group, an aryl group, an arylalkyl group and/or a halogen group may optionally be introduced into A" and B", at a ratio of 100:1–3,000.

The polycarbonate resin used in this invention is produced by reacting a dihydric phenol with a carbonate precursor via solution method or a melting method. As the dihydric phenol, 2,2-bis(4-hydroxyphenyl)propane (bisphenol A) can desirously be used, and part or the whole thereof may be replaced with the other dihydric phenol. Examples of the other dihydric phenol are bis(4-hydroxyphenyl)methane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl)sulfide, and bis(4-hydroxyphenyl)sulfone. Examples of the carbonate precursor are carbonyl halides and haloformates. Preferable are dihaloformates of phosgene, diphenyl carbonate and dihydric phenol, and mixtures thereof.

A degree of polymerization of the polycarbonate resin is not particularly limited. When said degree of polymerization is expressed by a viscosity average molecular weight, it is usually 10,000 to 50,000, preferably 13,000 to 40,000. In producing such a polycarbonate resin, a molecular weight modifier, a branching agent for improving processability, a catalyst for promoting the reaction, etch. can be used as required. Moreover, some kinds of the thus obtained polycarbonate resins may be used in combination.

The partially esterified phosphoric acid metal salt used as a fire retardant in this invention is represented by formula [1]. Especially preferable is a compound represented by formula [1']

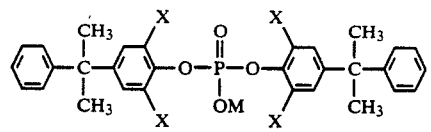

wherein X denotes a hydrogen atom or a halogen atom, and M denotes an alkali metal atom.

Such a partially esterified phosphoric acid metal salt can be produced, for example, by reacting 4-cumylphenol or 4-cumylphenol halogenated in a usual manner with phosphorus oxychloride in the presence of a suitable dehydrochlorination catalyst (e.g., amines and metal salts such as AlCl₃, etc.) to form diarylphosphoric acid chloride and hydrolyzing it with an aqueous solution of an alkali metal hydroxide, etc.

The partially esterified phosphoric acid jointly used with the partially esterified phosphoric acid metal salt in this invention is represented by formula [2]. Especially preferable is a compound represented by formula [2']

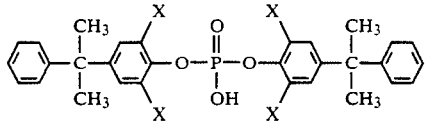

[2']

wherein X denotes a hydrogen atom or a halogen atom. Such a partially esterified phosphoric acid can be produced, for example, by reacting 4-cumylphenol or 4-cumylphenol halogenated in a usual manner with phosphorus oxychloride in the presence of the aforesaid suitable dehydrochlorination catalyst to form diarylphosphoric acid chloride, and hydrolyzing it.

Moreover, the mixture of the partially esterified phosphoric acid metal salt and the partially esterified phosphoric acid can be produced by reacting the partially esterified phosphoric acid with an alkali metal in a smaller number of mols than a number of mols of the partially esterified phosphoric acid.

As the combination of the partially esterified phosphoric acid metal salt of formula [1] with the partially esterified phosphoric acid of formula [2], a combination of the partially esterified phosphoric acid metal salt with the partially esterified phosphoric acid (conjugated acid) corresponding thereto is most preferable from the aspect of synthesis. However, a combination with the partially esterified phosphoric acid other than the conjugated acid is also available.

The ratio of the partially esterified phosphoric acid metal salt of formula [1] and the partially esterified phosphoric acid of formula [2] can optionally be selected from the range of 100:1–3,000; 100:5–100 is preferable. Presence of the partially esterified phosphoric acid provides high heat stability. When the ratio of the partially esterified phosphoric acid in the mixture is higher than the above range, a reverse effect is brought forth, and heat stability is decreased compared to a case of not containing the partially esterified phosphoric acid. When the ratio of the partially esterified phosphoric acid is changed within the above range, a degree of heat stability is also changed. Accordingly, the optimum ratio that provides the highest heat stability is easily selected experimentally on a case-by-case basis.

The total amount of the partially esterified phosphoric acid metal salt of formula [1] and the partially esterified phosphoric acid of formula [2] is usually 0.001 to 5 parts by weight, preferaly 0.005 to 2 parts by weight per 100 parts by weight of the polycarbonate resin. When it is less than 0.001 part by weight, an effect of fire retardance is insufficient. When it exceeds 5 parts by weight, improvement of fire retardance is saturated, and besides heat stability comes to be decreased. The joint use of it with an ordinary organic halogen compound-type fire retardant can much improve the effect of fire retardance, and the amounts of both the compounds can be greatly decreased.

The resin composition of this invention can be produced by any method. For example, the partially esterified phosphoric acid metal salt of formula [1] and the partially esterified phosphoric acid of formula [2] in powdery form are added to the powdery polycarbonate resin either as a mixture or separately in optional order. In case the polycarbonate resin is not dry, it is dried and then mixed by a super mixer or a tumbler to produce the resin composition of this invention.

The resulting composition can be formed into a molded article by an ordinary method such as injection molding, extrusion molding or compression molding either as such or after being pelletized with an extruder. The thus obtained molded article is excellent in transparency, fire retardance and heat stability.

By the way, the composition of this invention can contain, if required, any additives such as a stabilizer, a release agent, a lubricant, an antistatic agent, a UV absorber, and an organic halogen compound-type fire retardant. Moreover, if transparency is sacrificed, a fluorine polymer, a silicon polymer, an inorganic filler, glass fibers and carbon fibers may be added thereto.

The following Examples illustrate this invention more specifically. In said Examples, heat stability and fire retardance were evaluated as follows.

Heat stability

A color shade (L, a, b) of a color sample formed by an injection molding machine under such conditions that a cylinder temperature was 300° C. and a mold temperature was 80° C. and a color shade (L', a', b') of a color sample formed after retained in a cylinder for 10 minutes were measured by a color difference meter. ΔE (a degree of discoloration caused by retention for 10 minutes) was then found according to the following equation. Heat stability was evaluated by said ΔE.

$$\Delta E = \sqrt{(L - L')^2 + (a - a')^2 + (b - b')^2}$$

Fire retardance:

Using a test piece of 120 mm × 6.5 mm × 3.0 mm, O.I. was measured according to ASTM D-2863-70. Fire retardance was evaluated by said O.I.

EXAMPLES 1 TO 3 AND COMPARATIVE EXAMPLES 1 AND 2

To 100 parts by weight of a previously dried polycarbonate resin [Panlite L-1250: a trademark for a product of Teijin Chemicals, Ltd.] was added 0.1 part by weight of a mixture comprising a partially esterified phosphoric acid metal salt ("A" in Table 1) represented by the following formula

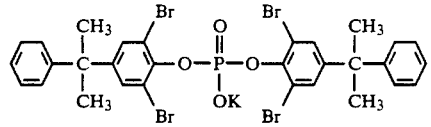

and a partially esterified phosphoric acid ("B" in Table 1) represented by the following formula.

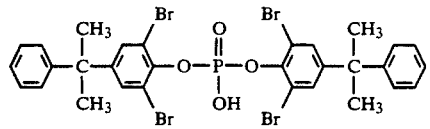

They were mixed, and the mixture was then extruded through a monoaxial bent-type extruder with a cylinder temperature set at 280° C. to form pellets. The obtained pellets were dried at 120° C. for 6 hours, and a color sample and a burning test piece were then formed by an injection molding machine under such conditions that a cylinder temperature was 300° C. and a mold temperature was 80° C. Heat stability and fire retardance were evaluated by the aforesaid methods. The results are shown in Table 1. By the way, Comparative Example 2 is an example wherein the mixture of the aromatic group-containing, partially esterified phosphoric acid metal salt and the partially esterified free phosphoric acid were not added.

TABLE 1

|  | A:B mixing ratio | Heat stability E | Fire retardance O.I. |
|---|---|---|---|
| Example 1 | 100:4 | 0.5 | 31.0 |
| Example 2 | 100:20 | 0.2 | 30.9 |
| Example 3 | 100:100 | 1.0 | 30.3 |
| Comparative Example 1 | 100:0 | 1.7 | 30.8 |
| Comparative Example 2 | — | 0.1 | 26.0 |

The molded article made of the composition in this invention is, as is apparent from the data in Table 1, excellent in fire retardance and heat stability. Accordingly, the composition of this invention has advantages that it allows little occurrence of a corrosive gas in molding and burning compared to the ordinary free retardant polycarbonater resin composition, and so forth. Thus, it can be utilized in the wide-ranging usage.

What we claim is:

1. A fire retardant polycarbonate resin composition comprising:
   100 parts by weight of a polycarbonate resin; and
   0.001 to 5 parts by weight, in total of
   (i) a partially esterified phosphoric acid metal salt represented by formula (1)

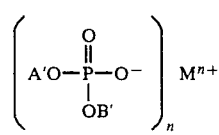

(1)

wherein
A' and B', independently from each other, each denote an aromatic group, or
A' and B', independently from each other, each denote an aromatic group and are linked with each other either directly or via an alkylene group, or
A' and B', independently from each other, each denote an aromatic group and form together one fused ring, and
A' and B' are unsubstituted or substituted by a member selected from the group consisting of an alkyl group, and aryl group, an arylalkyl group and a halogen;

M denotes an alkali metal atom or an alkaline earth metal atom; and
n is a number corresponding to a valence of M; and (ii) a partially esterified phosphoric acid represented by formula (2)

(2)

wherein
A" denotes an aromatic group, and
B" denote an aromatic group or a hydrogen atom,
with the proviso that, when A" and B" are both aromatic groups, A" and B" are linked with each other directly or via an alkylene group or A" and B" form together one fused ring, and
A" and B" are unsubstituted or substituted by a member selected from the group consisting of an alkyl group, an aryl group, an arylalkyl group and a halogen, at a ratio of 100:1–3,000.

2. The composition of claim 1 wherein the partially esterified phosphoric acid metal salt and the partially esterified phosphoric acid are contained in the total amount of 0.005 to 2 parts by weight.

3. The composition of claim 1 wherein the partially esterified phosphoric acid metal salt and the partially esterified phosphoric acid are contained at a ratio of 100:5–100.

4. The composition of claim 1, 2, or 3 wherein the partially esterified phosphoric acid metal salt is a compound represented by the formula

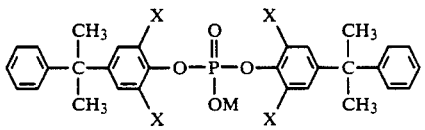

wherein X denotes a hydrogen atom or a halogen atom, and M denotes an alkali metal atom, and the partially esterified phosphoric acid is a compound represented by the following formula

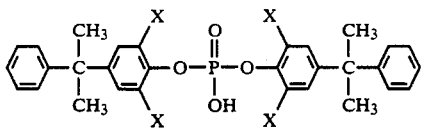

wherein X denotes a hydrogen atom or a halogen atom.

* * * * *